(12) United States Patent
Enke

(10) Patent No.: US 10,899,465 B2
(45) Date of Patent: Jan. 26, 2021

(54) MOTOR CONTROL OPTIMIZATIONS FOR UNMANNED AERIAL VEHICLES

(71) Applicant: GoPro, Inc., San Mateo, CA (US)

(72) Inventor: Joseph A. Enke, Campbell, CA (US)

(73) Assignee: GoPro, Inc., San Mateo, CA (US)

( * ) Notice: Subject to any disclaimer, the term of this patent is extended or adjusted under 35 U.S.C. 154(b) by 285 days.

(21) Appl. No.: 15/906,731

(22) Filed: Feb. 27, 2018

(65) Prior Publication Data

US 2019/0210737 A1 Jul. 11, 2019

Related U.S. Application Data

(60) Provisional application No. 62/614,150, filed on Jan. 5, 2018.

(51) Int. Cl.
| | |
|---|---|
| *B64C 39/02* | (2006.01) |
| *B64D 31/00* | (2006.01) |
| *B64D 31/06* | (2006.01) |
| *B64D 45/00* | (2006.01) |
| *G07C 5/08* | (2006.01) |

(52) U.S. Cl.
CPC ............ *B64D 31/06* (2013.01); *B64C 39/024* (2013.01); *B64D 31/00* (2013.01); *B64D 45/00* (2013.01); *G07C 5/0841* (2013.01); *B64C 2201/042* (2013.01); *B64C 2201/108* (2013.01); *B64D 2045/0085* (2013.01)

(58) Field of Classification Search
CPC ........ B64C 2201/042; B64C 2201/027; B64C 39/024; B64C 2201/108; B64D 31/06; B64D 31/00; B64D 45/00; B64D 2045/0085; G07C 5/0841
USPC .......................................................... 701/3
See application file for complete search history.

(56) References Cited

U.S. PATENT DOCUMENTS

| | | | |
|---|---|---|---|
| 9,975,644 B1* | 5/2018 | Kimchi ................ | B64C 39/024 |
| 2015/0336667 A1* | 11/2015 | Srivastava .......... | G05D 1/1064 |
| | | | 701/2 |
| 2017/0043862 A1* | 2/2017 | Lippincott ............ | B64C 39/024 |
| 2017/0222594 A1* | 8/2017 | Tao ...................... | H02P 29/028 |
| 2018/0356217 A1* | 12/2018 | Jensen ................. | G01C 23/005 |
| 2018/0375568 A1* | 12/2018 | De Rosa .............. | H04W 72/04 |
| 2019/0094861 A1* | 3/2019 | Menzel ................ | G08G 5/0069 |

* cited by examiner

*Primary Examiner* — Behrang Badii
*Assistant Examiner* — Hossam M Abd El Latif
(74) *Attorney, Agent, or Firm* — Young Basile Hanlon & MacFarlane, P.C.

(57) ABSTRACT

A motor controller of an unmanned aerial vehicle (UAV) is optimized to improve operation of the UAV. The motor control optimizations include controlling a motor of a UAV to reduce an operating temperature of the UAV, reducing an amount of latency or jitter resulting from motor operation, and applying a smoothing filter for motor operation. For example, controlling a motor of a UAV to reduce an operating temperature of the UAV can include using a temperature model for the unmanned aerial vehicle or an operating temperature measurement to determine a current operating temperature and comparing that current operating temperature to a threshold. If the threshold is exceeded, settings of the motor are adjusted to cause the motor to operate in a manner that reduces the current operating temperature.

20 Claims, 9 Drawing Sheets

MOTOR CONTROL OPTIMIZATIONS FOR UNMANNED AERIAL VEHICLES

CROSS REFERENCE TO RELATED APPLICATION(S)

This disclosure claims the benefit of U.S. Provisional Application No. 62/614,150, filed Jan. 5, 2018, the disclosure of which is hereby incorporated by reference in its entirety.

TECHNICAL FIELD

This disclosure relates to motor control optimizations for unmanned aerial vehicles (UAVs).

BACKGROUND

UAVs may be used for commercial and recreational purposes. For example, a user may operate a UAV to capture photographs from higher altitudes than the user can reach by himself or herself. In another example, a user may operate a UAV to control the delivery of a good, such as to a purchaser. The UAV includes motors for driving the UAV or constituent systems thereof. The motors can be controlled, such as to adjust the operation of the UAV.

SUMMARY

Systems and techniques for motor control optimizations for a UAV are described below. One aspect of the disclosure is a method for controlling a motor of a UAV. The method includes determining a temperature model for the unmanned aerial vehicle based on modeling data produced by components of the unmanned aerial vehicle. The method further includes estimating a current operating temperature of the unmanned aerial vehicle based on the temperature model and an operating time of the unmanned aerial vehicle. The method further includes determining that the current operating temperature exceeds a threshold indicative of a maximum operating temperature of the unmanned aerial vehicle. The method further includes, responsive to determining that the current operating temperature exceeds the threshold, using a motor controller to produce a command reflecting adjusted settings of the motor. The method further includes transmitting the command to the motor. The command causes the motor to operate at the adjusted settings. Operation of the motor at the adjusted settings reduces the current operating temperature.

Another aspect of the disclosure is a UAV. The UAV includes a health system including one or more components for measuring one or more operating conditions of the unmanned aerial vehicle. The UAV further includes a motor controller including a dynamic controller that processes data indicative of the one or more operating conditions measured using the one or more components of the health system to determine that a current operating temperature of the unmanned aerial vehicle exceeds a maximum operating temperature of the unmanned aerial vehicle. The UAV further includes a motor that operates according to commands received from the motor controller. Responsive to a determination by the motor controller that the current operating temperature exceeds the maximum operating temperature, the motor controller transmits a command to the motor to cause the motor to operate at adjusted settings, wherein operation of the motor at the adjusted settings reduces the current operating temperature.

Another aspect of the disclosure is a non-transitory computer-readable storage medium, comprising processor-executable routines that, when executed by a processor, facilitate a performance of operations at a UAV. The operations include determining a current operating temperature of the unmanned aerial vehicle based on data produced using one or more sensors. The operations further include determining that the current operating temperature exceeds a threshold. The operations further include, responsive to determining that the current operating temperature exceeds the threshold, adjusting one or more settings of a motor of the unmanned aerial vehicle. The operations further include, subsequent to the adjusting, causing the motor to operate according to the one or more settings.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly indicates otherwise.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

A motor of a UAV drives the UAV or a system thereof using a signal received from a motor controller of the UAV.

The motor controller receives and processes instructions, information, or the like from a system of the UAV to produce a signal used to control the motor in a certain way. The motor functions according to the signal (e.g., according to a power, an amplitude, or another aspect of the signal, or a combination thereof) such that the operation of the UAV may change based on the functionality of the motor controller. As such, improvements to the motor controller can result in improvements to the overall operation of the UAV.

One example of the functionality of the motor controller affecting the operation of the UAV relates to the operating temperature of a UAV. The operating temperature of the UAV (e.g., the internal temperature thereof) increases over time during the operation of the UAV. In particular, motors can generate large amounts of heat, so the increase in the operating temperature of the UAV may be caused by the standard operation of a motor. In some cases, if the operating temperature increases beyond a desirable amount, the operating temperature may cause one or more components of the UAV to overheat. For example, a battery or other power source of the UAV may not be able to function when the operating temperature of the UAV is above a certain value. If adjustments are not made to the motor to reduce the operating temperature of the UAV, the UAV may suffer a failure or fault causing it to cease to be operational or otherwise lose functionality.

Implementations of this disclosure include motor control optimizations for a UAV. The motor control optimizations include controlling a motor of a UAV to reduce an operating temperature of the UAV, reducing an amount of latency or jitter resulting from motor operation, and applying a smoothing filter for motor operation. For example, controlling a motor of a UAV to reduce an operating temperature of the UAV can include using a temperature model for the unmanned aerial vehicle or an operating temperature measurement to determine a current operating temperature and comparing that current operating temperature to a threshold. If the threshold is exceeded, settings of the motor are adjusted to cause the motor to operate in a manner that reduces the current operating temperature.

The implementations of this disclosure will now be described in detail with reference to the drawings that are provided as illustrative examples to enable those skilled in the art to practice the technology. The figures and examples below are not meant to limit the scope of this disclosure to a single implementation; other implementations are possible by way of interchange of or combination with some or all of the described or illustrated elements. Wherever convenient, the same reference numbers will be used throughout the drawings to refer to same or like parts.

Figure 1A:
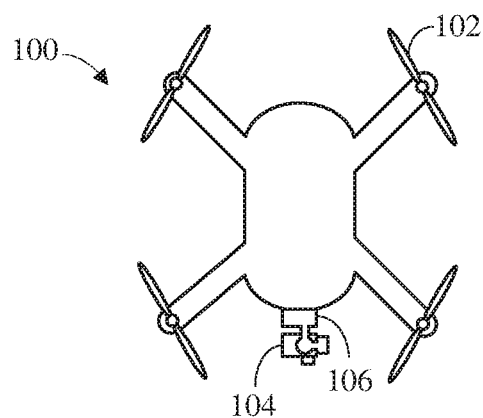
FIG. 1A shows an example of a UAV.

FIG. 1A shows an example of a UAV 100. In this implementation, the UAV 100 has a quad-copter configuration, that is, the UAV 100 includes four rotors 102. Each rotor 102 is driven by a separate electric motor (not shown). However, the UAV 100 may be any form of aerial vehicle. A battery pack (not shown) mounted on or in a body of the UAV 100 may supply electrical power to all four electric motors, flight electronics (not shown) associated with operation of the UAV 100, and an imaging device 104 that provides still and video images by means of a communication link (not shown) to a ground-based user. The imaging device 104 may be coupled to a front of the UAV 100 using, for example, a movement mechanism 106.

In FIG. 1A, the movement mechanism 106 removably mounts the imaging device 104 to the UAV 100. The implementation of the movement mechanism 106 shown in this example is a three-axis gimbal that permits the imaging device 104 to be rotated about three independent axes. However, the movement mechanism 106 may include any type of translational and/or rotational elements that permit rotational and/or translational movement in one, two, or three dimensions of the imaging device 104 in respect to the UAV 100.

Figure 1B:
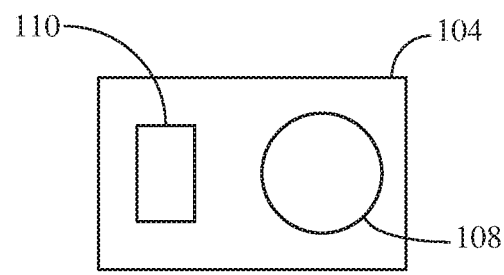
FIG. 1B shows an example of the imaging device associated with the UAV.

FIG. 1B shows an example of the imaging device 104 associated with the UAV 100. In FIG. 1B, the imaging device 104 is a GoPro Hero4® or Hero5® camera; however, any type of imaging device 104 that can be coupled to the UAV 100, for example, through use of the movement mechanism 106, may be utilized. The imaging device 104 may include still image and video capture capabilities. FIG. 1B shows a lens 108 of the imaging device 104 and a display screen 110 associated with the imaging device 104. Means for coupling the imaging device 104 to the UAV 100 and/or the movement mechanism 106 are not shown.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

Figure 1C:
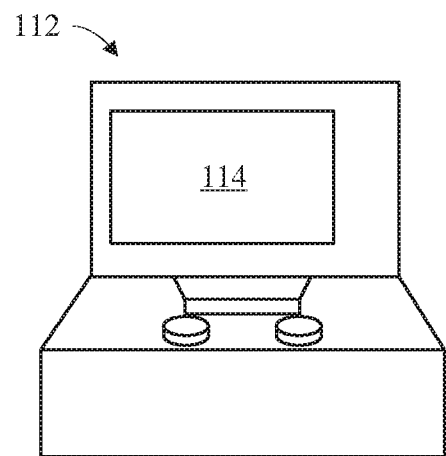
FIG. 1C shows an example of a remote controller and user interface for the UAV.

FIG. 1C shows an example of a remote controller 112 including a user interface 114 for operating the UAV 100. The remote controller 112 may include a communications interface (not shown) via which the remote controller 112 may receive and send commands related to operation of the UAV 100, the imaging device 104, and the movement mechanism 106. The commands can include movement commands, configuration commands, operational control commands, and imaging commands. In some implementations, the remote controller 112 may be a smartphone, a tablet computer, a phablet, a smart watch, a portable computer, and/or another device configured to receive user input and communicate information with the imaging device 104, the movement mechanism 106, and/or the UAV 100.

For example, flight direction, attitude, and altitude of the UAV 100 may all be controlled by controlling speeds of the motors that drive the respective rotors 102 of the UAV 100. During flight, a GPS receiver on the UAV 100 may provide navigational data to the remote controller 112 for use in determining flight paths and displaying a current location of the UAV 100 through the user interface 114. A vision-based navigation system that tracks visually significant features through image data captured by the imaging device 104 to provide the necessary speed and position of the UAV 100 to the remote controller 112 may also be implemented.

The communications interface may utilize any wireless interface configuration, for example, WiFi, Bluetooth (BT), cellular data link, ZigBee, near field communications (NFC) link, for example, using ISO/IEC 14443 protocol, ANT+ link, and/or other wireless communications link. In some implementations, the communications interface may be effectuated using a wired interface, for example, HDMI, USB, digital video interface, display port interface (e.g., digital display interface developed by the Video Electronics Standards Association (VESA), Ethernet, Thunderbolt), and/or other interface.

The remote controller 112 may operate a software application (e.g., GoPro Studio®, GoPro App®, and/or other application) configured to perform a variety of operations related to camera configuration, positioning of the movement mechanism 106, control of video acquisition, and/or display of video captured by the imaging device 104 through the user interface 114. An application (e.g., GoPro App®)

may enable a user to create short video clips and upload video clips to a cloud service (e.g., Instagram®, Facebook®, YouTube®, Dropbox®); perform full remote control of functions of the imaging device 104; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 104 and/or displaying the captured information.

Figure 2:
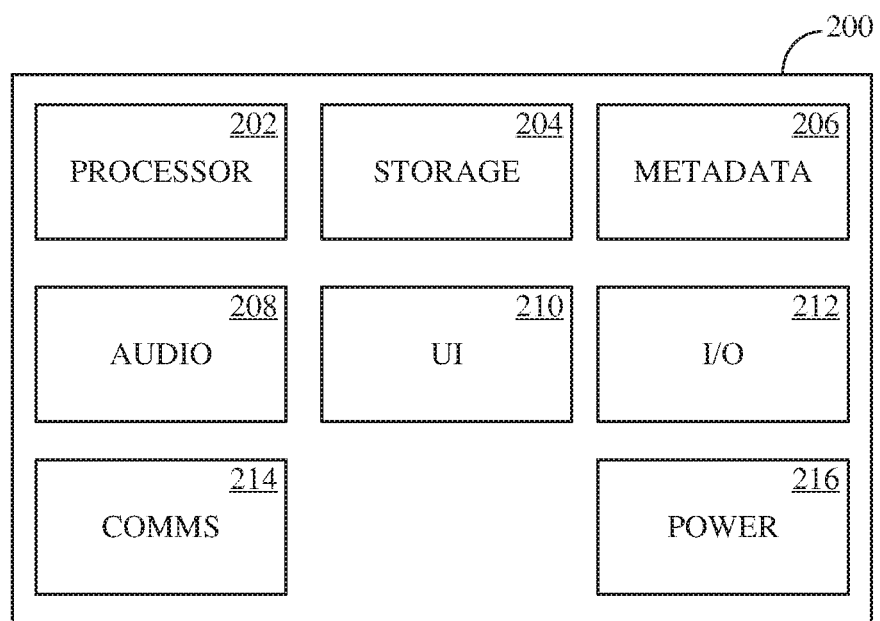
FIG. 2 is a block diagram illustrating components of a computing device.

FIG. 2 is a block diagram illustrating components of a computing device 200. The computing device 200 may be a single component of the UAV 100, the imaging device 104, the movement mechanism 106, or the remote controller 112. The computing device 200 may be one or more multiple computing devices distributed in various ways between the UAV 100, the imaging device 104, the movement mechanism 106, or the remote controller 112. In the examples described, the computing device 200 may provide communication and control functions to the various components described in reference to FIGS. 1A, 1B, and 1C.

The computing device 200 may be or otherwise include one or more personal computers (PCs) or minicomputers, for example, desktop, laptop, or other computers. For example, the computing device 200 can be or otherwise include one or more mainframe computers, workstations, servers, personal digital assistants (PDAs), handheld computers, embedded computers, programmable logic devices (PLDs), personal communicators, tablet computers, portable navigation aids, J2ME equipped devices, cellular telephones, smart phones, personal integrated communication or entertainment devices, or other devices capable of executing a set of instructions.

The computing device 200 may include a processor 202. The processor 202 is a digital processing device that controls the operation and functionality of the UAV 100, the imaging device 104, the movement mechanism 106, and/or the remote controller 112. The processor 202 may interface with mechanical, electrical, sensory, and power modules via driver interfaces and software abstraction layers. By way of non-limiting example, the processor 202 may include one or more of systems on a chip (SoCs), microcontrollers, microprocessors, central processing units (CPUs), application-specific integrated circuits (ASICs), graphical processing units (GPUs), digital signal processors (DSPs), reduced instruction set computers (RISCs), general-purpose (CISC) processors, microprocessors, gate arrays (e.g., field programmable gate arrays (FPGAs)), PLDs, reconfigurable computer fabrics (RCFs), array processors, secure microprocessors, or the like. Such digital processors may be contained on a single unitary integrated circuit or distributed across multiple components.

Additional processing and memory capacity may be used to support these processes. These components may be fully controlled by the processor 202. In some implementations, one or more components may be operable by one or more other control processes. For example, a GPS receiver may include a processing apparatus configured to provide position and motion information to the processor 202 in accordance with a given schedule (e.g., values of latitude, longitude, and elevation at 10 Hz).

The computing device 200 may also include electronic storage 204, in which configuration parameters, image data, and/or code for functional algorithms may be stored. The electronic storage 204 may include a system memory module that is configured to store executable computer instructions that, when executed by the processor 202, control various functions of the UAV 100, the imaging device 104, the movement mechanism 106, and/or the remote controller 112. The system memory of the computing device 200 can include an integrated circuit or other storage device adapted for storing digital data including, for example, DRAM, Mobile DRAM, SDRAM, DDR/2 SDRAM, EDO/FPMS, RLDRAM, SRAM, memristor memory, PSRAM, or the like.

The electronic storage 204 may include storage memory configured to store content (e.g., metadata, frames, video, and audio) captured by the imaging device 104 or sensors associated with the UAV 100, the movement mechanism 106, and/or the remote controller 112. The electronic storage 204 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture.

The memory of the electronic storage 204 can include an integrated circuit or other storage device adapted for storing digital data, including, for example, ROM, PROM, EEPROM, "flash" memory (e.g., NAND/NOR), or the like. Additional electronic storage 204 may be available for other hardware, firmware, or software needs of the UAV 100, the imaging device 104, the movement mechanism 106, and/or the remote controller 112. The memory and processing capacity may aid in management of processing configuration (e.g., loading, replacement) operations during a startup and/or other operations.

The computing device 200 may include or be in communication with metadata sources 206. The metadata sources 206 may include sensors associated with the UAV 100, the imaging device 104, and/or the movement mechanism 106. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infrared-based depth sensor, such as a Kinect-style depth sensor, and a stereo depth sensor), and/or other sensors. The imaging device 104 may also provide metadata sources 206, for example, image sensors, a battery monitor, storage parameters, and other information related to camera operation and capture of content. The metadata sources 206 may obtain information related to an environment of the UAV 100 and aspects in which the content is captured.

By way of non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 206 may be rigidly coupled to the UAV 100, the imaging device 104, the movement mechanism 106, and/or the remote controller 112, such that the processor 202 may be operable to synchronize various types of information received from various types of metadata sources 206.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 202 may perform operations on the received metadata to generate additional metadata information. For example, the processor 202 may integrate received acceleration information to determine a velocity profile of the imaging device 104 during a recording of a video.

The computing device 200 may include or be in communication with audio sources 208, such as one or more microphones, configured to provide audio information that may be associated with images acquired by the imaging device 104 or commands provided by the remote controller 112. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec). In one or more implementations of spherical video and audio, the audio codec may include a 3-dimensional audio codec. For example, an Ambisonics codec can produce full surround audio including a height dimension. Using a G-format Ambisonics codec, a special decoder may not be required.

The computing device 200 may include or be in communication with a user interface (UI) 210. The UI 210 may include a display configured to provide information related to operation modes (e.g., camera modes, flight modes), connection status (e.g., connected, wireless, wired), power modes (e.g., standby, sensor, video), metadata sources 206 (e.g., heart rate, GPS, barometric), and/or other information associated with the UAV 100, the imaging device 104, the movement mechanism 106, and/or the remote controller 112. In some implementations, the UI 210 may include virtually any device capable of registering inputs from and communicating outputs to a user. These may include, without limitation, display, touch, gesture, proximity, light, sound receiving/emitting, wired/wireless, and/or other input/output devices. The UI 210 may include a display, one or more tactile elements (e.g., joysticks, switches, buttons, and/or virtual touch screen buttons), lights (e.g., LED, LCD, or the like), speakers, and/or other interface elements.

The UI 210 may be configured to enable the user to provide commands to the UAV 100, the imaging device 104, and/or the movement mechanism 106. For example, the user interface 114 shown in FIG. 1C is one example of the UI 210. User commands provided using the UI 210 may be encoded using a variety of approaches, including but not limited to duration of a button press (pulse-width modulation), number of button presses (pulse-code modulation), or a combination thereof. For example, two short button presses through the UI 210 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 200 may include an input/output (I/O) module 212. The I/O module 212 may be configured to synchronize the imaging device 104 with the remote controller 112, a second capture device, a smartphone, and/or a video server. The I/O module 212 may be configured to communicate information to and from various I/O components. The I/O module 212 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 212 may interface with LED lights, a display, a button, a microphone, speakers, and other I/O components. In one or more implementations, the I/O module 212 may be coupled to an energy source such as a battery or other DC electrical source.

The computing device 200 may include a communication module 214 coupled to the I/O module 212. The communication module 214 may include a component (e.g., a dongle) having an infrared sensor, a radio frequency transceiver and antenna, an ultrasonic transducer, and/or other communications interfaces used to send and receive wireless communication signals. In some implementations, the communication module 214 may include a local (e.g., Bluetooth, Wi-Fi, or the like) or broad range (e.g., 3G, Long Term Evolution (LTE), or the like) communications interface configured to enable communications between the UAV 100, the imaging device 104, the movement mechanism 106, and/or the remote controller 112.

The communication module 214 may employ communication technologies including one or more of Ethernet, 802.11, worldwide interoperability for microwave access (WiMAX), 3G, LTE, digital subscriber line (DSL), asynchronous transfer mode (ATM), InfiniBand, PCI Express Advanced Switching, and/or other communication technologies. By way of non-limiting example, the communication module 214 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 214 may be represented using formats including one or more of hypertext markup language (HTML), extensible markup language (XML), and/or other formats. One or more exchanges of information between the imaging device 104 and outside devices, such as the remote controller 112, may be encrypted using encryption technologies including one or more of secure sockets layer (SSL), transport layer security (TLS), virtual private networks (VPNs), Internet Protocol security (IPsec), and/or other encryption technologies.

The computing device 200 may include a power system 216 that may moderate a power supply based on the needs of the UAV 100, the imaging device 104, the movement mechanism 106, and/or the remote controller 112. For example, a battery, solar cell, inductive (contactless) power source, rectification, or other power supply housed within the UAV 100 may be controlled by the power system 216 to supply power for the imaging device 104 and/or the movement mechanism 106 when in a coupled state as shown in FIG. 1A.

Implementations of the computing device 200 may include additional, fewer, or different components than are shown in FIG. 2. In some implementations, the computing device 200 may include optics. For example, the optics may include a lens, such as the lens 108 shown in FIG. 1B. The lens may, for example, include a standard lens, macro lens, fisheye lens, zoom lens, special-purpose lens, telephoto lens, prime lens, achromatic lens, apochromatic lens, process lens, wide-angle lens, ultra-wide-angle lens, infrared lens, ultraviolet lens, perspective control lens, or the like.

In some implementations, the computing device 200 may include an image sensor. For example, the image sensor may be a charge-coupled device (CCD) sensor, active pixel sensor (APS), complementary metal-oxide semiconductor (CMOS) sensor, N-type metal-oxide-semiconductor (NMOS) sensor, or the like, or a combination thereof. The image sensor may be configured to capture light waves gathered by optics of the computing device 200 and generate image data based on control signals from a sensor controller. For example, the optics may include focus controller functionality configured to control the operation and configuration of a lens, such as for receiving light from an object and transmitting the received light to the image sensor. The image sensor may use the received light to generate an output signal conveying visual information regarding an object. For example, the visual information may include one or more of an image, a video, and other visual information.

In some implementations, the computing device 200 can include one or more integrated circuits. For example, an integrated circuit can be or otherwise include an electronic circuit manufactured by the patterned diffusion of trace elements into the surface of a thin substrate of semiconductor material. By way of non-limiting example, integrated circuits may include FPGAs, PLDs, RCFs, SoCs, ASICs, or other types of integrated circuits. In some implementations, the computing device 200 can be included in an integrated circuit.

As used herein, the term "computer program" or "software," such as software executable by or otherwise performed at the computing device 200 (and, therefore, at a UAV including the computing device 200) is meant to include any sequence or machine cognizable operations which perform a function. Such program may be rendered in virtually any programming language or environment including, for example, C/C++, C #, Fortran, COBOL, MAT-LAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), or Binary Runtime Environment (e.g., BREW).

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards. As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Figure 3:
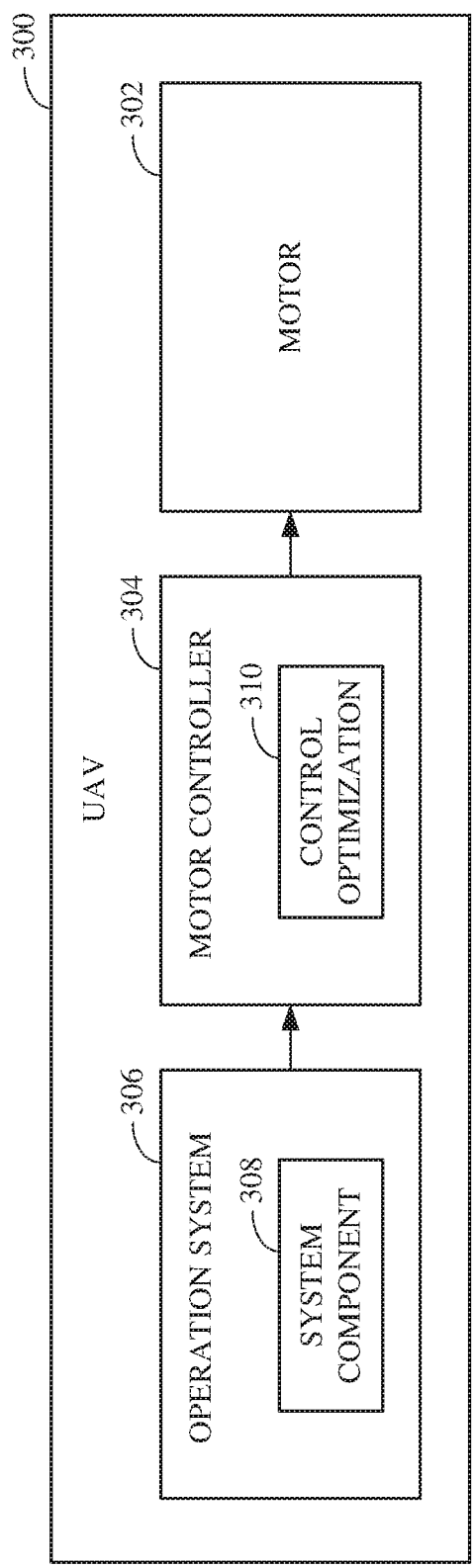
FIG. 3 is a block diagram of a UAV including motor control optimizations.

FIG. 3 is a block diagram of a UAV 300 including motor control optimizations. The UAV 300 may, for example, be the UAV 100 shown in FIG. 1A. The UAV 300 includes a motor 302, a motor controller 304, and an operation system 306. The motor 302 receives a signal including an amount of power for driving the UAV 300 or a portion thereof (e.g., a propeller system of the UAV 300, a stabilizer system of the UAV 300, or the like). The motor controller 304 controls the signal that is transmitted to and used by the motor 302 to drive the UAV 300 or the portion thereof. For example, the motor controller 304 can produce the signal used by the motor 302 based on information received from the operation system 306.

The operation system 306 represents one or more hardware and/or software components of the UAV 300 used to monitor or enable an aspect of operation of the UAV 300. The operation system 306 includes a system component 308. The system component 308 is one or more components of the operation system 306. For example, where the operation system 306 is a system for monitoring a health of the UAV 300, the system component 308 can include a power component (e.g., a battery) indicative of a remaining power level, a thermometer or other sensor that measures a current operating temperature of the UAV 300, a barometer and GPS combination that measures an altitude at which the UAV 300 is currently operating, or the like.

The motor controller 304 is intermediary to the operation system 306 and the motor 302 and is configured to control the operation of the motor 302 based on data received from the operation system 306. The motor controller 304 includes a control optimization mechanism 310. The control optimization mechanism 310 includes software for processing data received from the operation system 306, such as to determine how to adjust settings or other configurations of the motor 302 to further enable operation of the motor 302 or otherwise prevent a malfunction of the motor 302 or of the UAV 300 caused by the continued operation of the motor 302 without adjustment.

For example, the system component 308 can include sensors or other components of the UAV 300 usable to monitor failures of the UAV 300 or conditions that can cause a failure of the UAV 300. The operation system 306 may thus transmit data used to indicate a failure or a fault to the motor controller 304. The control optimization mechanism 310 can process the data received from the operation system 306 to determine a manner by which to adjust the operation of the motor 302. This can be used, for example, for system safety purposes, real-time monitoring purposes, or the like.

The UAV 300 can include one or more motor control optimizations for improving performance of the motor 302 or otherwise improving performance of the UAV 300 by controlling the motor 302 in some way. In some implementations, the UAV 300 can include motor control optimizations for controlling the motor 302 based on an operating temperature of the UAV 300. For example, the system component 308 can measure a current operating temperature of the UAV 300 or otherwise use operating temperature modeling to determine an optimal temperature at which the UAV 300 should operate. The operation system 306 can communicate that information to the motor controller 304. The motor controller 304 can use the communicated information to, for example, reduce a speed of the motor 302 so as to cause a reduction of the operating temperature of the UAV 300. Implementations and examples of controlling a motor based on an operating temperature of a UAV are described below with respect to FIGS. 4-5.

In some implementations, the UAV 300 can include motor control optimizations for controlling the motor 302 using data transmitted over a communication bus. For example, a communication bus may enable communication between the operation system 306 and the motor controller 304. For example, the communication bus can be used to transmit packetized data to the motor controller 304. The packetized data may be processed using a packet processing mechanism at the operation system 306, such as to control a size of the packets, a speed at which the packets are transmitted, or the like. The processing of the packets and communication of the processed packets over the communication bus can result in reduced latency, jitter, or both for the UAV 300. Implementations and examples of controlling a motor using data transmitted over a communication bus are described below with respect to FIGS. 6-7.

In some implementations, the UAV 300 can include motor control optimizations for controlling the motor 302 using a smoothing filter. For example, a smoothing filter can be included in or otherwise used by the motor controller. The smoothing filter can process input received from the operation system 306 to improve efficiency, vibration, sound, or other aspects of the operation of the UAV 300, or a combination thereof. For example, the smoothing filter can receive speed feedback for the UAV 300 and process the received speed feedback to produce filtered speed data. The filtered speed data can then be used to control the motor 302. Implementations and examples of controlling a motor using a smoothing filter are described below with respect to FIGS. 8-9.

The motor control optimizations described with respect to the UAV 300 (and as described below with respect to the UAVs and techniques shown in FIGS. 4 through 9) may be implemented for one or more motors of a UAV. For example, the motor 302 may be a motor of a stabilization drive system, a motor of a propeller drive system, or another motor. In some cases, the UAV 300 may include multiple motor controllers. For example, some of the motor controllers may be for stabilizer drive systems, and others of the motor controllers may be for propeller drive systems. One or more of the motor control optimizations described with respect to the UAV 300 (and as described below with respect to the UAVs and techniques shown in FIGS. 4 through 9) may be implemented for some or all of those multiple motor controllers.

Figure 4:
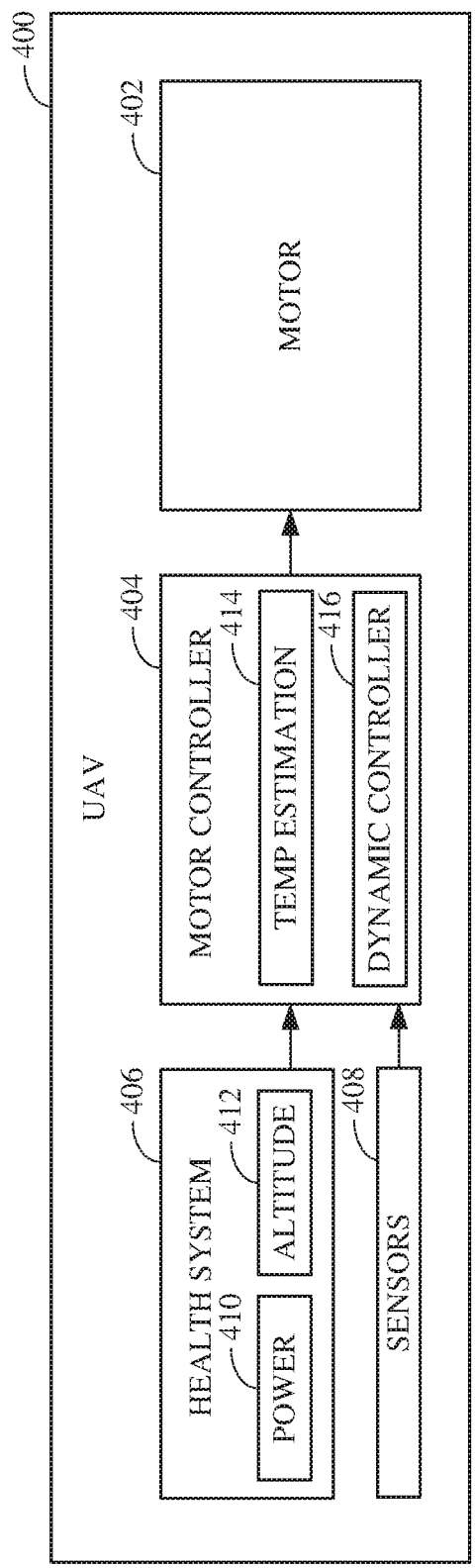
FIG. 4 is a block diagram illustrating an example of a UAV including components for controlling a motor based on an operating temperature of the UAV.

FIG. 4 is a block diagram illustrating an example of a UAV 400 including components for controlling a motor 402 based on an operating temperature of the UAV 400. The UAV 400 includes a motor 402, a motor controller 404, and a health system 406. The UAV 400 may, for example, be the UAV 300 shown in FIG. 3. For example, the motor 402, the motor controller 404, and the health system 406 may, respectively, be the motor 302, the motor controller 304, and the operation system 306 shown in FIG. 3.

The motor controller 404 controls the motor 402 based on an operating temperature of the UAV 400. For example, the motor controller 404 can adjust a speed of the motor 402, an amount of power that is transmitted to the motor 402 for driving some or all of the UAV 400, or the like. The motor controller 404 can control the motor 402 using data received from the health system 406. Alternatively, the motor controller 404 can control the motor 402 using data received from sensors 408.

The health system 406 includes components for measuring operating conditions of the UAV 400, such as may be used to determine a temperature model for the UAV 400. For example, the health system 406 can include a power component 410 and an altitude component 412. The power component 410 may include a battery or other power source and one or more hardware and/or software components for measuring a remaining power level of the battery or of the other power source. The altitude component 412 may include a barometer and a GPS component and one or more hardware and/or software components for determining a current altitude of the UAV 400 based on measurements taken by the barometer and the GPS component.

The motor controller 404 includes a temperature estimation mechanism 414 that processes data from the power component 410 and from the altitude component 412 to determine a temperature model for the UAV 400. The temperature model reflects possible or likely operating temperatures of the UAV 400 based on the data from the power component 410 and from the altitude component 412. For example, the temperature model can reflect that the operating temperature of the UAV 400 is likely higher when the power component 410 indicates that relatively little power remains. In another example, the temperature model can reflect that the operating temperature of the UAV 400 is likely higher when the altitude component 412 indicates that the UAV 400 is operating at a relatively high altitude.

The temperature estimation mechanism 414 determines a temperature model for the UAV 400 based on operating times of the UAV 400. For example, where the UAV 400 is operated for a shorter period of time, there is a lower likelihood that a relatively low remaining power or a relatively high operating altitude indicates a high operating temperature of the UAV 400. The temperature model thus reflects an estimated operating temperature of the UAV 400 based on an amount of power and/or an altitude and also based on time. The temperature model may be stored as a record in a database or other data store accessible by the motor controller 404.

Alternatively, the sensors 408 can measure all or a portion of the UAV 400 to produce sensor data indicative of a current operating temperature of the UAV 400. For example, the sensors 408 can include a thermometer that measures an operating temperature of the UAV 400 and passes the measurement to the motor controller 404 for processing by the temperature estimation mechanism 414. In some cases, the sensor data produced using the sensors 408 can be compared to data from the health system 406, such as to determine that the operating temperature estimated based on the data from the health system 406 and the operating time of the UAV 400 is accurate.

The data processed by the temperature estimation mechanism 414 is communicated to a dynamic controller 416 of the motor controller 404. The dynamic controller 416 processes the data received from the temperature estimation mechanism 414 to determine whether and how to adjust settings of the motor 402, such as based on a current operating temperature determined by the temperature estimation mechanism 414. For example, the dynamic controller 416 can determine whether the current operating temperature exceeds a threshold indicative of a maximum operating temperature of the UAV 400. The maximum operating temperature may, for example, reflect a maximum temperature at which one or more components of the UAV 400 (e.g., a battery) can safely operate.

If the dynamic controller 416 determines that the current operating temperature does not exceed the maximum operating temperature, the dynamic controller 416 does not adjust settings of the motor 402. However, if the dynamic controller 416 determines that the current operating temperature does exceed the maximum operating temperature, the dynamic controller 416 then adjusts one or more settings of the motor 402. For example, the one or more settings may relate to an amount of power supplied to the motor 402 to drive all or a portion of the UAV 400.

The dynamic controller 416 can produce a command indicative of the adjustments to the settings of the motor 402. For example, the command can include a pulse-width modulation signal having reduced power. The motor controller 404 transmits the command to the motor 402 to cause the motor 402 to operate according to the settings as adjusted using the dynamic controller 416. For example, where the settings are adjusted to cause less power to be supplied to the motor 402, the operation of the motor 402 at the adjusted settings reduces the current operating temperature of the UAV 400.

Although the UAV 400 is described as having functionality for controlling the motor 402 based on the operating temperature of the UAV 400, other implementations of the UAV 400 may reflect other functionality for controlling the motor 402. In some implementations, the health system 406 can produce and transmit data indicating a health of the UAV 400 independent of the operating temperature of the UAV 400. The motor controller 404 (e.g., using the dynamic controller 416) can process the data received from the health system 406 to determine whether and how to adjust settings of the motor 402.

For example, the power component 410 can indicate that a battery or other power source of the UAV 400 will soon be depleted. The motor controller 404 can process corresponding data from the power component 410 to decrease an amount of power supplied to the motor 402. In another example, the health system 406 can transmit data indicating that the motor 402 requires greater or lesser torque to operate. The motor controller 404 can process this data and send a signal to the motor 402 to accordingly cause the motor 402 to operate with such greater or lesser torque.

In some implementations, the threshold indicative of the maximum operating temperature of the UAV 400 may change over time during the operation of the UAV 400. For example, towards the beginning of the operation of the UAV 400, the threshold may indicate a higher temperature as the maximum operating temperature, such as because the current operating temperature is relatively low. However, after some amount of time during the operation of the UAV 400, the threshold may indicate a lower temperature, such as because the UAV 400 may not be able to operate at a much higher temperature.

In some implementations, one or both of the sensors 408 or the temperature estimation mechanism 414 may be omitted. For example, the dynamic controller 416 can process data received from the health system 406 alone to control the motor 402 (e.g., by adjusting an operation of the motor 402), such as based on temperature models determined based on the power component 410 and the altitude component 412.

In some implementations, one or both of the health system 406 (e.g., and thus the power component 410 and the altitude component 412) or the dynamic controller 416 may be omitted. For example, the temperature estimation mechanism 414 can process data received from the sensors 408 alone to control the motor 402 (e.g., by adjusting the operation of the motor 402), such as based on a current operation temperature of the UAV 400 measured using the sensors 408.

In some implementations, the sensors 408 may be included in the health system 406. In some implementations, one or both of the power component 410 or the altitude component 412 may be omitted. In some implementations, the health system 406 may include components other than the power component 410 or the altitude component 412.

Figure 5:
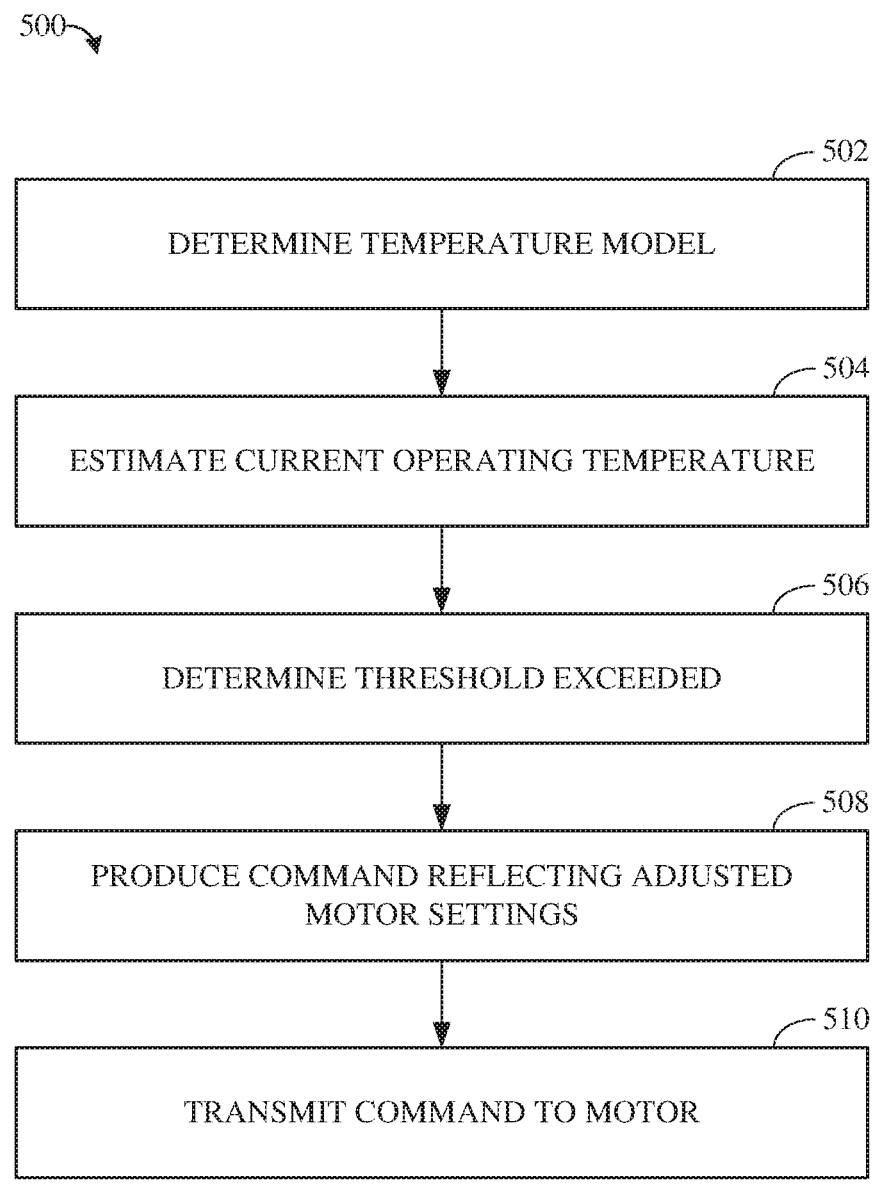
FIG. 5 is a flowchart showing an example of a technique for controlling a motor based on an operating temperature of the UAV.

FIG. 5 is a flowchart showing an example of a technique 500 for controlling a motor based on an operating temperature of the UAV. The technique 500 can be performed, for example, using hardware and/or software components of a UAV, such as the UAV 400 shown in FIG. 4. Although the technique 500 is described with respect to a series of operations, the operations comprising the technique 500 may be performed in orders other than those described herein. In some implementations, the technique 500 may include additional, fewer, or different operations than are described herein.

At 502, a temperature model is determined for the UAV. The temperature model is determined based on modeling data produced by components of the UAV. The modeling data can be produced by measuring operating conditions of the UAV using components of a health system of the UAV, such as the health system 406 shown in FIG. 4. For example, the components of the health system include a power component and an altitude component. The power component can measure an operating condition reflecting a remaining amount of power within a battery or other power source of the UAV. The altitude component can measure an operating condition reflecting an altitude at which the UAV operates.

A motor controller of the UAV can receive the modeling data produced by the components of the health system. The motor controller can use the received data to determine the temperature model. For example, the motor controller can determine the temperature model based on the produced modeling data by analyzing the modeling data over time to determine estimated operating temperatures of the UAV. The estimated operating temperatures represent possible temperatures at which the UAV might operate given particular operating conditions measured using components of the health system and given an operating time of the UAV (e.g., an amount of time that the UAV has been in operation).

The temperature model can be stored in a database or other data store accessible by the motor controller. For example, the database or other data store may include one record, or a set of records, corresponding to the estimated operating temperatures determined by the motor controller. For example, a given record may reflect a particular operating condition and a particular operating time, as well as the estimated operating temperature of the UAV based on such particular operating condition and particular operating time. The records in the database or other data store can be updated as further modeling data is produced over time during operation of the UAV.

At 504, a current operating temperature of the UAV is estimated. The current operating temperature of the UAV is estimated based on the temperature model and an operating time of the UAV (e.g., a current amount of the time that the UAV has been in operation). For example, the motor controller can estimate the current operating temperature of the UAV by retrieving a record associated with the temperature model from a database or other data store. The record can reflect an estimated operating temperature of the UAV based on modeling data produced by components of the health system of the UAV (e.g., a power component and an altitude component) and based on the operating time of the UAV.

At 506, a determination is made that a threshold is exceeded by the current operating temperature. The threshold is indicative of a maximum operating temperature of the UAV. The maximum operating temperature can, for example, reflect a maximum temperature at which a battery or other power source of the UAV is able to operate, such as without experiencing a failure or fault. The determination can thus include determining that the current operating temperature exceeds the maximum operating temperature. The maximum operating temperature may be a default value, such as may be configured during the manufacture of the UAV, a value configured by a user of the UAV (e.g., based on specifications of one or more components of the UAV), or the like.

At 508, a command is produced using the motor controller of the UAV. The command reflects adjustments to one or more settings of a motor of the UAV. The adjustments are made responsive to determining that the current operating temperature exceeds the maximum operating temperature of the UAV. The command can include a pulse-width modulation signal configured for receipt by the motor of the UAV. The pulse-width modulation signal can be defined based on settings of the motor, such as which define an amount of power to supply to the motor, an amount of current, or the like, or a combination thereof.

Producing the command thus includes determining adjustments to make to the settings of the motor to cause the current operating temperature to be reduced below the maximum operating temperature. Producing the command further includes modifying a pulse-width modulation signal used by the motor according to the adjusted settings. At 510, subsequent to adjusting the settings of the motor (e.g., and modifying the pulse-width modulation signal), the command is transmitted to the motor.

In some implementations, the technique 500 further includes producing sensor data indicative of a current operating temperature of the UAV using one or more sensors of the UAV. For example, the one or more sensors (e.g., a thermometer) can produce sensor data reflecting an accurate operating temperature of the UAV. The motor controller can use the sensor data to determine that the current operating temperature estimated based on the temperature model and the operating time is accurate.

The motor controller can use the sensor data to train the temperature model. For example, the sensor data can be used to cull estimated operating temperatures that are determined over time to not accurately reflect an operating temperature of the UAV (e.g., given particular operating conditions and operating times). In another example, the sensor data can be used to modify estimated operating temperatures to more accurately reflect an operating temperature of the UAV (e.g., given particular operating conditions and operating times).

In some implementations, the technique 500 can omit determining the temperature model of the UAV and estimating the current operating temperature of the UAV. For example, the UAV may include one or more sensors (e.g., a thermometer) configured to measure an accurate operating temperature of the UAV. Those sensors can thus be used in place of the components of the health system to indicate an accurate operating temperature to the motor controller. The motor controller can then compare the accurate operating temperature measured using the sensors against the threshold to determine whether and how to adjust settings of the motor.

Figure 6:
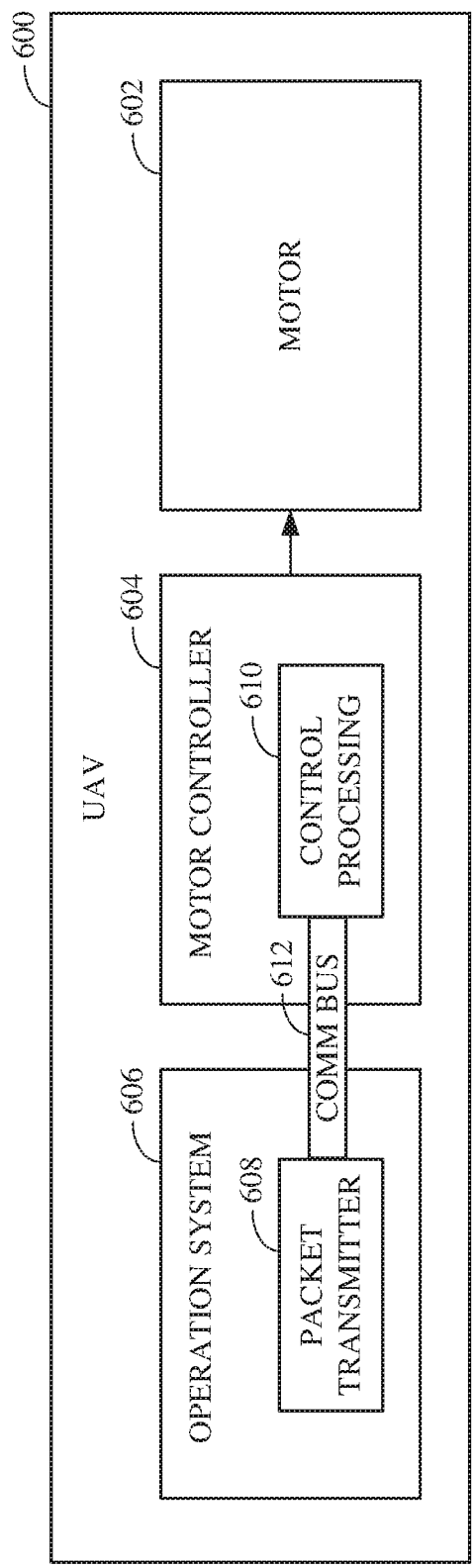
FIG. 6 is a block diagram illustrating an example of a UAV including components for controlling a motor using data transmitted over a communication bus.

FIG. 6 is a block diagram illustrating an example of a UAV 600 including components for controlling a motor 602 using data transmitted over a communication bus. The UAV 600 includes a motor 602, a motor controller 604, and an operation system 606. The UAV 600 may, for example, be the UAV 300 shown in FIG. 3. For example, the motor 602, the motor controller 604, and the operation system 606 may, respectively, be the motor 302, the motor controller 304, and the operation system 306 shown in FIG. 3.

The ability of the motor controller 604 to accurately control the motor 602 is at least in part based on an amount of latency in the transmission of data from the operation system 606 to the motor controller 604. For example, the operation system 606 may include components used to detect operational conditions of the UAV 600. Data produced by those components can be used by the motor controller 604 to control the motor 602, for example, as described above with respect to FIGS. 4-5. However, the data produced using components of the operation system 606 may be subject to a latency. Latency generally refers to the delay in the transmission of signal from one hardware or software component to another hardware or software component.

The operation system 606 includes a packet transmitter 608 configured to adjust one or more aspects of the transmission of data from the operation system 606 to the motor controller 604. For example, the packet transmitter 608 can adjust a rate at which data packets are transmitted from the operation system 606 to the motor controller 604. In another example, the packet transmitter 608 can limit a size of data packets that may be transmitted from the operation system 606 to the motor controller 604. In yet another example, the packet transmitter 608 can restrict communications between the operation system 606 and the motor controller 604 to allow only high priority data packets to be transmitted.

The data packets are transmitted from the operation system 606 to the motor controller 604 over a communication bus 612. The communication bus 612 includes one or more connections between the operation system 606 and the motor controller 604 (e.g., between the packet transmitter 608 and the control processing mechanism 610). The communication bus 612 can denote one or more types of interconnection or communication architecture that may be used to communicate data between the operation system 606 and the motor controller 604. The communication bus 612 can be optical, wireless, infrared, another type of communication medium, or a combination thereof. The exact topology of the communication bus 612 could be a standard bus, a hierarchical bus, a network-on-chip, an address-event-representation (AER) connection, or another type of communication topology used for accessing components of the UAV 600.

The packet transmitter adjusts aspects of the transmission of data from the operation system 606 to the motor controller 604 by maximizing a frequency of the communication bus 612. In particular, the packet transmitter 608 increases a rate at which data packets are sent over the communication bus 612 to maximize the frequency of the communication bus 612. For example, where a data packet is of size N, the rate at which the data packet is transmitted over the communication bus 612 can be increased from 2N to 100N.

In some implementations, the UAV 600 can include functionality for reducing an amount of jitter in the transmission of data from the operation system 606 to the motor controller 604 over the communication bus 612, such as instead of or in addition to reducing the amount of latency in such a transmission of data. Jitter generally refers to the variance on a signal including data being transmitted from one hardware or software component to another hardware or software component. The amount of jitter can cause the data transmitted from the operation system 606 to the motor controller 604 to be inaccurate.

As such, and for example, if the amount of jitter exceeds a threshold value (e.g., a default or configurable value indicative of an amount of jitter at which data becomes unusable or the accuracy of the data otherwise suffers beyond a negligible amount), the motor controller 604 may not be able to control the motor 602 as needed. The amount of jitter can be reduced by the packet transmitter 608 adjusting one or more aspects of the transmission of data over the communication bus 612, for example, as described above.

Figure 7:
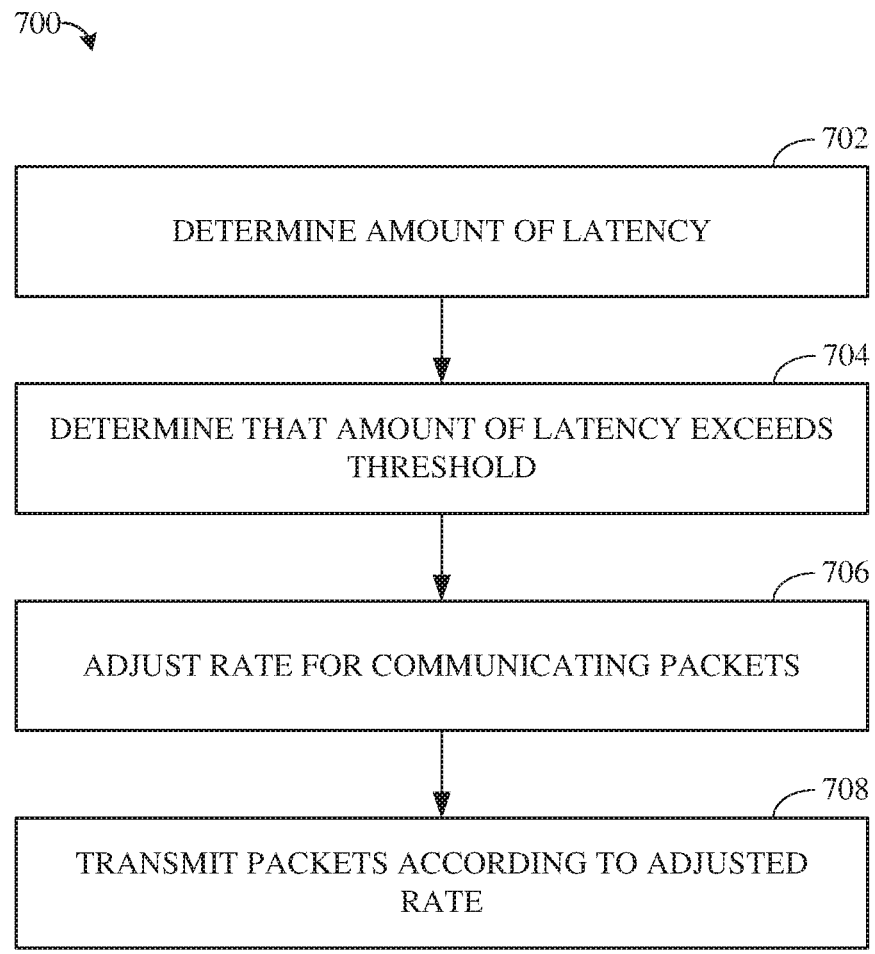
FIG. 7 is a flowchart showing an example of a technique for controlling a motor using data transmitted over a communication bus.

FIG. 7 is a flowchart showing an example of a technique 700 for controlling a motor using data transmitted over a communication bus. The technique 700 can be performed, for example, using hardware and/or software components of a UAV, such as the UAV 600 shown in FIG. 6. Although the technique 700 is described with respect to a series of operations, the operations comprising the technique 700 may be performed in orders other than those described herein. In some implementations, the technique 700 may include additional, fewer, or different operations than are described herein.

At 702, an amount of latency is determined. The amount of latency represents a delay in the transmission of data packets over a communication bus of a UAV (e.g., respectively, the communication bus 612 and the UAV 600 shown in FIG. 6), such as from an operation system of the UAV to a motor controller of the UAV (e.g., respectively, the operation system 606 and the motor controller 604 shown in FIG. 6). Determining the amount of latency can include transmitting a first data packet over the communication bus and measuring the latency resulting therefrom.

At 704, a determination is made that a threshold is exceeded by the amount of latency. The threshold represents a maximum amount of latency that can result before the quality of the communication begins to suffer or suffers beyond an allowable amount. The threshold may be defined as a default value, configured by a user of the UAV, or the like. For example, the threshold may reflect that the maximum amount of allowable latency is 1 ms or less. The threshold is thus exceeded if the amount of latency determined above is greater than 1 ms.

At 706, responsive to determining that the threshold is exceeded by the amount of jitter, a rate at which packets are communicated over the communication bus is adjusted. Adjusting the rate can include maximizing a frequency of the communication bus. The frequency of the communication bus can be adjusted based on the size of the data packets to be transmitted over the communication bus. For example, where a data packet to transmit over the communication bus is 10 bits, the frequency of the communication bus can be increased from 100 Hz to 10 kHz. For example, where a data packet to transmit over the communication bus is 40 to 50 bits, the frequency of the communication bus can be increased from 200 Hz to 2 MHz.

At 708, the data packets are transmitted over the communication bus from the operation system to the motor controller according to the adjusted rate. The amount of latency resulting from the transmission of the data packets over the communication bus according to the adjusted rate is less than the amount of latency determined prior to when the rate is adjusted. For example, as a result of the rate adjusting, the amount of latency in the transmission of data packets over the communication bus can be negligible.

In some implementations, the technique 700 can include adjusting aspects associated with the communicating of data packets over the communication bus other than latency. For example, the technique 700 can be performed to reduce an amount of jitter in the data packets transmitted over the communication bus from the operation system to the motor controller. For example, the technique 700 can include determining an amount of jitter in the transmission of data packets over the communication bus, comparing that amount of jitter to a threshold value indicative of an amount of jitter at which the quality of the data begins to suffer or suffers beyond an allowable amount, and adjusting the rate at which the data packets are transmitted based on results of that comparison, such as to reduce the amount of jitter.

Figure 8:
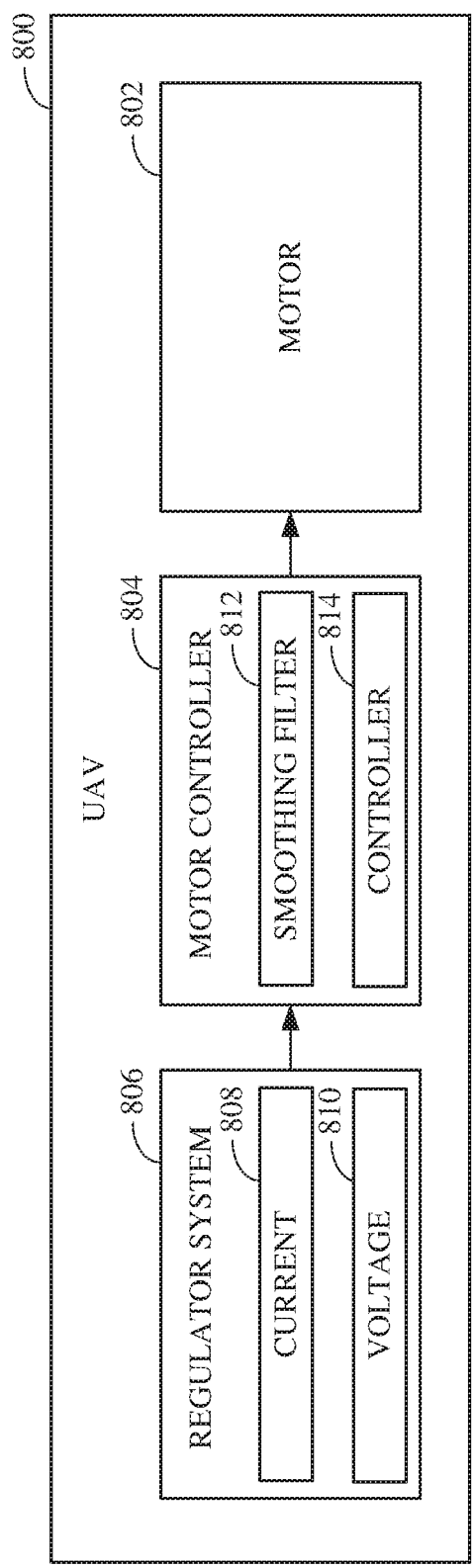
FIG. 8 is a block diagram illustrating an example of a UAV including components for controlling a motor using a smoothing filter.

FIG. 8 is a block diagram illustrating an example of a UAV 800 including components for controlling a motor 802 using a smoothing filter. The UAV 800 includes a motor 802, a motor controller 804, and a regulator system 806. The UAV 800 may, for example, be the UAV 300 shown in FIG. 3. For example, the motor 802, the motor controller 804, and the regulator system 806 may, respectively, be the motor 302, the motor controller 304, and the operation system 306 shown in FIG. 3.

The regulator system 806 uses an amount of current 808 and an amount of voltage 810, or otherwise includes an amount of the current 808 and an amount of the voltage 810 within, to produce a signal that is to be used to control the motor 802. That is, the amount of the current 808 and the amount of the voltage 810 can ultimately control the power and amplitude of the signal used by the motor controller 804 to control the motor 802.

The amount of the current 808 and the amount of the voltage 810 have high frequency noise and may generally be noisy. For example, the amount of the current 808 and the amount of the voltage 810 may indicate to cause a very fast movement of a hardware component using the motor 802 (e.g., by changing an orientation of a gimbal from a first orientation to a second orientation). In some cases, the noise of the amount of the current 808 and of the amount of the voltage 810 may exceed a desired amount.

In such cases, the motor controller 804 applies a smoothing filter 812. The smoothing filter 812 may, for example, be a low-pass filter. The smoothing filter 812 is tuned to reduce the amount of noise of the amount of the current 808 and of the amount of the voltage 810 by a defined amount (e.g., a default or configurable amount). Applying the smoothing filter 812 to a signal including the amount of the current 808 and the amount of the voltage 810 includes applying conditions against the amount of the current 808 and against the amount of the voltage 810 and subsequently determining whether the conditions result in less noise as a result of the application of such conditions.

The conditions available for application of the smoothing filter 812 may be defined by default or configured by a user of the UAV 800. After the application of the smoothing filter 812 to the amount of the current 808 and to the amount of the voltage 810 of the signal received from the regulator system 806, the motor controller 804 uses a controller 814 to control the motor 802 according to the filtered signal. As a result of the application of the smoothing filter 812, the filtered signal may have greater efficiency, less vibration, less sound output, or like improvements, or a combination thereof, such as over the pre-filtered signal.

Figure 9:
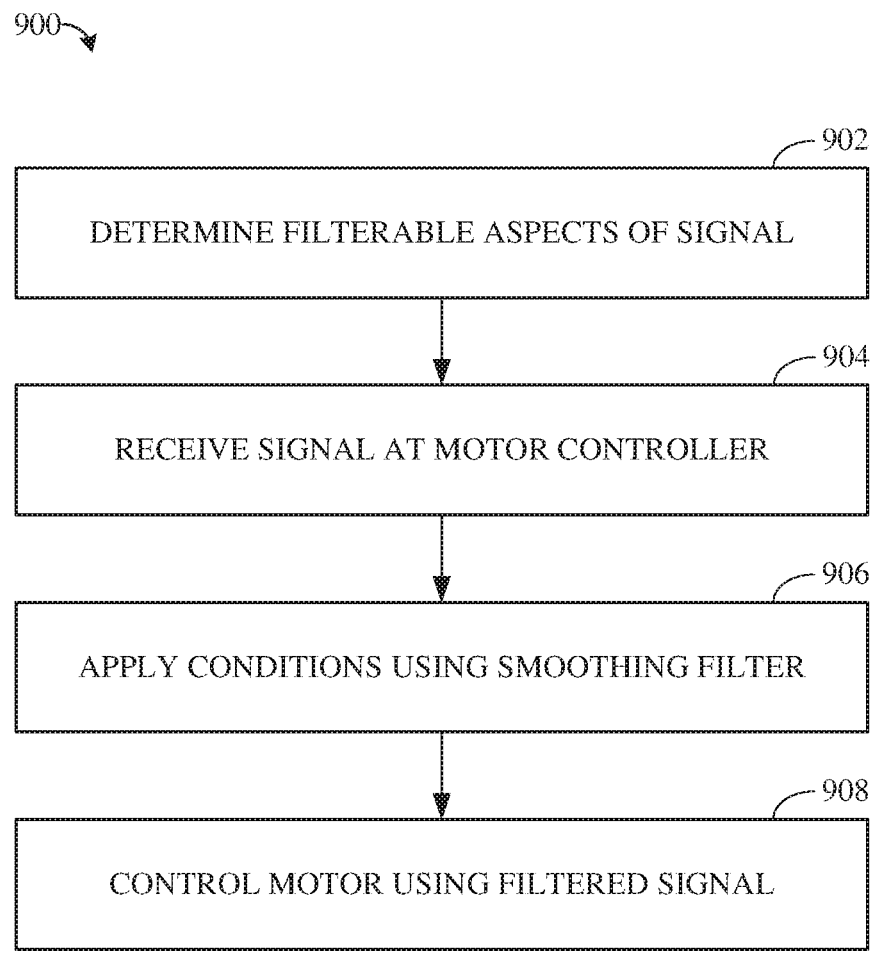
FIG. 9 is a flowchart showing an example of a technique for controlling a motor using a smoothing filter.

FIG. 9 is a flowchart showing an example of a technique 900 for controlling a motor using a smoothing filter. The technique 900 can be performed, for example, using hardware and/or software components of a UAV, such as the UAV 800 shown in FIG. 8. Although the technique 900 is described with respect to a series of operations, the operations comprising the technique 900 may be performed in orders other than those described herein. In some implementations, the technique 900 may include additional, fewer, or different operations than are described herein.

At 902, filterable aspects of a signal to use to control a motor of the UAV are determined. The aspects of the signal may include an amount of current and an amount of voltage, which amount of current and which amount of voltage define a power and amplitude of the signal. Determining the aspects of the signal may further include measuring those aspects. For example, the amount of current and the amount of voltage may both be determined.

At 904, the signal can be received at a motor controller of the UAV. For example, the signal can be transmitted from an operation system at which the signal is produced (e.g., the operation system 306 shown in FIG. 3, the regulator system 806 shown in FIG. 8, or the like) to the motor controller (e.g., the motor controller 804 shown in FIG. 8). For example, the signal may be transmitted over a communication bus (e.g., the communication bus 612 shown in FIG. 6).

At 906, one or more conditions of a smoothing filter are applied to the signal. The one or more conditions can reflect changes to make to the amount of current of the signal, the amount of voltage of the signal, or both, such as to reduce the amount of noise therefrom. Applying the one or more conditions can include determining the one or more conditions to apply. For example, sets of candidate conditions can be applied to determine noise reduction values resulting from the application of those sets of candidate conditions. The set of candidate conditions resulting in the greatest noise reduction value can then be selected and applied to the signal. A set of candidate conditions may include one or more conditions. A filtered signal is produced as a result of the application of the conditions to the signal. At 908, the filtered signal is used by the motor controller to control the motor of the UAV.

Implementations of a UAV may include one or more of the motor control optimizations separately described with respect to FIGS. 4 through 9. As such, even though the systems and techniques described with respect to FIGS. 4-5, FIGS. 6-7, and FIGS. 8-9, respectively, reflect different implementations and examples for motor control optimizations for a UAV, those implementations and examples may in at least some cases be combined. For example, the UAV 300 can be the UAV 400, the UAV 600, the UAV 800, or a combination thereof. The software and/or hardware components of the UAV 300 may therefore be configured to perform the technique 500, the technique 700, the technique 900, or a combination thereof.

Where certain elements of these implementations may be partially or fully implemented using known components, it may be the case that only those portions of such known components that are necessary for an understanding of this disclosure have been described. Detailed descriptions of other portions of such known components may have been omitted so as not to obscure the disclosure.

Where certain aspects of the implementations described herein are described in terms of a specific sequence of operations of a method, these descriptions are only illustrative of the broader methods of the disclosure and may be modified as required by the particular applications thereof. Certain operations may be rendered unnecessary or optional under certain circumstances. Additionally, certain operations or functionality (or functionalities, as the case may be) may be added to the disclosed implementations, or the order of performance of two or more operations may be permuted.

All such variations are considered to be encompassed within the scope and spirit of the disclosure.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

While the above detailed description has shown, described, and pointed out novel features of the disclosure as applied to various implementations, it will be understood that various omissions, substitutions, and changes in the form and details of the devices or processes illustrated may be made by those skilled in the art without departing from the scope and spirit of the disclosure. The foregoing description is in no way meant to be limiting, but rather should be taken as illustrative of the general principles of the technologies.

What is claimed is:

1. A method for controlling a motor of an unmanned aerial vehicle, the method comprising:
   determining a temperature model for the unmanned aerial vehicle based on modeling data produced by a power component of the unmanned aerial vehicle and by an altitude component of the unmanned aerial vehicle, wherein the temperature model indicates estimated operating temperatures for the unmanned aerial vehicle based on sets of modeling data produced by the power component and the altitude component and based on operating times of the unmanned aerial vehicle;
   estimating a current operating temperature of the unmanned aerial vehicle based on the temperature model and an operating time of the unmanned aerial vehicle;
   determining that the current operating temperature exceeds a threshold indicative of a maximum operating temperature of the unmanned aerial vehicle;
   responsive to determining that the current operating temperature exceeds the threshold, using a motor controller to produce a command reflecting adjusted settings of the motor; and
   transmitting the command to the motor, wherein the command causes the motor to operate at the adjusted settings, and wherein operation of the motor at the adjusted settings reduces the current operating temperature.

2. The method of claim 1, wherein determining the temperature model for the unmanned aerial vehicle based on the modeling data produced by components of the unmanned aerial vehicle comprises:
   producing the modeling data by measuring one or more operating conditions of the unmanned aerial vehicle using the power component and using the altitude component of the unmanned aerial vehicle; and
   analyzing the modeling data over time to determine estimated operating temperatures of the unmanned aerial vehicle.

3. The method of claim 2, wherein an operating condition of the one or more operating conditions measured using the power component reflects a remaining amount of power within a battery of the unmanned aerial vehicle, and wherein an operating condition of the one or more operating conditions measured using the altitude component reflects an altitude at which the unmanned aerial vehicle operates.

4. The method of claim 3, wherein estimating the current operating temperature of the unmanned aerial vehicle based on the temperature model and the operating time of the unmanned aerial vehicle comprises:

retrieving a record associated with the temperature model from a database, the record reflecting an estimated operating temperature of the unmanned aerial vehicle based on first data produced using the power component, second data produced using the altitude component, and the operating time.

5. The method of claim 2, wherein analyzing the modeling data over time to determine the estimated operating temperatures of the unmanned aerial vehicle comprises:

determining the temperature model using the motor controller.

6. The method of claim 1, wherein the maximum operating temperature reflects a maximum temperature at which a battery of the unmanned aerial vehicle operates.

7. The method of claim 1, further comprising:

producing sensor data indicative of the current operating temperature using one or more sensors of the unmanned aerial vehicle.

8. The method of claim 7, wherein estimating the current operating temperature of the unmanned aerial vehicle based on the temperature model and the operating time of the unmanned aerial vehicle comprises:

using the sensor data to determine that the current operating temperature estimated based on the temperature model and the operating time is accurate.

9. The method of claim 1, wherein using the motor controller to produce the command reflecting the adjusted settings of the motor of the unmanned aerial vehicle comprises:

modifying a pulse-width modulation signal used by the motor to drive at least a portion of the unmanned aerial vehicle according to the adjusted settings.

10. The method of claim 9, wherein transmitting the command to the motor comprises:

subsequent to the modifying, transmitting the pulse-width modulation signal to the motor.

11. An unmanned aerial vehicle, comprising:

a health system including a power component and an altitude component for measuring one or more operating conditions of the unmanned aerial vehicle;

a motor controller including a dynamic controller that processes modeling data indicative of the one or more operating conditions against a temperature model determined for the unmanned aerial vehicle to determine that a current operating temperature of the unmanned aerial vehicle exceeds a maximum operating temperature of the unmanned aerial vehicle, wherein the temperature model indicates estimated operating temperatures for the unmanned aerial vehicle based on sets of modeling data produced by the power component and the altitude component and based on operating times of the unmanned aerial vehicle; and a motor that operates according to commands received from the motor controller, wherein, responsive to a determination by the motor controller that the current operating temperature exceeds the maximum operating temperature, the motor controller transmits a command to the motor to cause the motor to operate at adjusted settings, wherein operation of the motor at the adjusted settings reduces the current operating temperature.

12. The unmanned aerial vehicle of claim 11, wherein an operating condition of the one or more operating conditions measured using the power component reflects a remaining amount of power within a battery of the unmanned aerial vehicle, and wherein an operating condition of the one or more operating conditions measured using the altitude component reflects an altitude at which the unmanned aerial vehicle operates.

13. The unmanned aerial vehicle of claim 11, wherein the motor controller determines the temperature model wherein the motor controller estimates the current operating temperature based on the temperature model and an operating time of the unmanned aerial vehicle.

14. The unmanned aerial vehicle of claim 13, wherein the motor controller determines that the current operating temperature of the unmanned aerial vehicle exceeds the maximum operating temperature based on the temperature model and the operating time.

15. The unmanned aerial vehicle of claim 13, further comprising one or more sensors that produce sensor data indicative of the current operating temperature.

16. The unmanned aerial vehicle of claim 15, wherein the motor controller uses the sensor data to determine that the current operating temperature estimated based on the temperature model and the operating time is accurate.

17. A non-transitory computer-readable storage medium, comprising processor-executable routines that, when executed by a processor, facilitate a performance of operations at an unmanned aerial vehicle, the operations comprising:

determining a current operating temperature of the unmanned aerial vehicle based on data produced using one or more sensors;

determining that the current operating temperature exceeds a threshold defined according to a temperature model, wherein the temperature model indicates estimated operating temperatures for the unmanned aerial vehicle based on sets of modeling data produced by a power component of the unmanned aerial vehicle and an altitude component of the unmanned aerial vehicle and based on operating times of the unmanned aerial vehicle;

responsive to determining that the current operating temperature exceeds the threshold, adjusting one or more settings of a motor of the unmanned aerial vehicle; and subsequent to the adjusting, causing the motor to operate according to the one or more settings.

18. The non-transitory computer-readable storage medium of claim 17, wherein operation of the motor at the one or more settings subsequent to the adjusting reduces the current operating temperature.

19. The non-transitory computer-readable storage medium of claim 17, wherein the threshold is indicative of a maximum operating temperature of the unmanned aerial vehicle.

20. The non-transitory computer-readable storage medium of claim 17, wherein the operations for causing the motor to operate according to the one or more settings comprise:

transmitting a command reflecting the one or more settings to the motor.

* * * * *